(12) United States Patent
Takahashi

(10) Patent No.: US 6,578,281 B2
(45) Date of Patent: Jun. 17, 2003

(54) APPARATUS AND METHOD FOR MEASURING SPHERICAL ARTICLE

(75) Inventor: Isao Takahashi, Ota-ku (JP)

(73) Assignee: I.B.S. Co., Ltd., Tokyo (JP)

( * ) Notice: Subject to any disclaimer, the term of this patent is extended or adjusted under 35 U.S.C. 154(b) by 0 days.

(21) Appl. No.: 09/880,875

(22) Filed: Jun. 15, 2001

(65) Prior Publication Data

US 2002/0011005 A1 Jan. 31, 2002

(30) Foreign Application Priority Data

Jun. 20, 2000 (JP) ........................................ 2000-184159

(51) Int. Cl.[7] ................................................. G01B 5/08
(52) U.S. Cl. ........................... 33/555.1; 33/549; 33/509
(58) Field of Search .............................. 33/555.1, 509, 33/555.3, 549, 550, 555, 502, 567

(56) References Cited

U.S. PATENT DOCUMENTS

| | | | | | |
|---|---|---|---|---|---|
| 1,563,011 | A | * | 11/1925 | Brookes ........................ | 33/502 |
| 2,785,474 | A | * | 3/1957 | Mages et al. .................. | 33/509 |
| 3,161,041 | A | * | 12/1964 | Amburgey .................... | 33/509 |
| 3,263,531 | A | * | 8/1966 | Sammons et al. ............. | 33/509 |
| 3,273,250 | A | * | 9/1966 | Egger ........................... | 33/555.1 |
| 3,797,123 | A | * | 3/1974 | Fraley ........................... | 33/178 B |
| 3,875,668 | A | * | 4/1975 | Taylor ........................... | 33/509 |
| 4,385,447 | A | * | 5/1983 | Bennett ......................... | 33/178 B |
| 4,528,759 | A | * | 7/1985 | Joyce et al. .................. | 33/178 B |
| 4,982,504 | A | * | 1/1991 | Soderberg et al. ............ | 33/502 |
| 5,603,165 | A | * | 2/1997 | Bernhardt et al. ............. | 33/509 |
| 5,813,129 | A | * | 9/1998 | Tseng ........................... | 33/509 |

* cited by examiner

Primary Examiner—Diego Gutierrez
Assistant Examiner—Travis Reis
(74) Attorney, Agent, or Firm—Oliff & Berridge PLC

(57) ABSTRACT

A spherical-article measuring apparatus has first and second support arms and a size detector. The first support arm has first and second ends. The first end can be brought in contact with a first curve section of a spherical article to be measured at one end of the diametrical line in the spherical article. The second end can be located spaced apart from and opposite to a second curve section of the spherical article at the other end of the diametrical line. The second support arm has a third end which can be brought in contact with a third curve section of the spherical article. The size detector can be brought in contact with the second curve section.

20 Claims, 5 Drawing Sheets

APPARATUS AND METHOD FOR MEASURING SPHERICAL ARTICLE

Japanese patent application 2000-184159 filed on Jun. 20, 2000 is hereby incorporated by reference in its entirety.

BACKGROUND OF THE INVENTION

1. Field of the Invention

The present invention concerns an apparatus and a method for measuring a spherical article.

2. Description of the Related Art

Generally, athletic spherical articles such as ten-pin bowling balls, billiards balls, volleyball balls and soccer balls are established in size according to the respective standards.

For example, the ten-pin bowling balls are standardized such that the diameters should be within the range between the maximum permissible size of 218.281 mm and the minimum permissible size of 215.900 mm.

Measuring devices for accurately measuring the diameter of such a ten-pin bowling ball is independently owned by a ball manufacturer. Such a measuring device has never been used in any formal match.

One of the reasons is that the measuring device is extremely expensive and the size being so large that it is impossible to bring the device to a match.

Therefore, in a formal match, two metallic rings formed with circular opening of the maximum and minimum permissible sizes are provided. When a ball is passed through the two metallic rings, it is then judged whether or not that ball is within the permissible size range. If so, that ball may be used as a standardized ball in the formal match.

Although the use of these metallic rings can judge whether or not the ball meets the standard, however, it cannot measure the diameter of the ball accurately.

SUMMARY OF THE INVENTION

An object of the invention is to provide an apparatus and a method for measuring a spherical article, which can measure the diameter of a spherical article precisely and which can be carried easily.

To this end, (1) the present invention provides a an apparatus for measuring a spherical article comprising:

- a first support arm having first and second ends, the first end being touchable to a first curve section at one end of a diametrical line of a spherical article to be measured, the second end being locatable spaced apart from and opposite to a second curve section at the other end of the diametrical line;
- a second support arm provided on the first support arm and having a third end touchable to a third curve section on the spherical article; and
- a size detector provided on the second end of the first support arm and being touchable to the second curve section.

According to the present invention, the first end of the first support arm and the third end of the second support arm are brought into contact with the spherical article to be supportive when the first and second support arms are applied to the spherical article. In this position, the first end of the first support arm and the size detector on the second end of the first support arm will be located on the diametrical line of the spherical article. Thus, the diameter of the spherical article sandwiched therebetween can be measured accurately by the size detector. In addition, this spherical-article measuring apparatus is simplified in structure and more easily carried.

(2) In this spherical-article measuring apparatus, the size detector may detect whether or not a size of the spherical article is within a permissible size range.

Such an arrangement ensures and facilitates finding whether or not the diameter of the spherical article is within the range between the maximum and minimum permissible sizes.

(3) This spherical-article measuring apparatus may further comprise:

- a first spherical-article touching portion extending from the first end of the first support arm;
- a second spherical-article touching portion extending from a portion of the first end of the first support arm at a position rotated by an angle greater than or equal to 90 degrees about a central point of the spherical article from the first end of the first support arm; and
- a third spherical-article touching portion extending from the third end of the second support arm.

In such an arrangement, three spherical-article touching portions formed on the first and second support arms can support the first and second support arms so that the spherical article can be supported more stably compared to the case in which the spherical article is brought into direct contact with the first and second support arms.

(4) In this spherical-article measuring apparatus, each of the spherical-article touching portions may have a spherical-article touching surface which extends two-dimensionally and at least corresponds to the permissible size range of the spherical article.

Such an arrangement ensures the detection of the diameter of the spherical article since each of the spherical-article touching surfaces can positively engage with the corresponding curve section of the spherical article on the diametrical line thereof even though the spherical article is of the maximum or minimum permissible size.

(5) In this spherical-article measuring apparatus, the size detector may have a dial gauge and a measuring element extending from the second end of the first support arm toward the second curve section of the spherical article.

Such an arrangement enables the dial gauge to measure the diameter of the spherical article accurately.

(6) In this spherical-article measuring apparatus, the measuring element may have a measuring surface at a tip end thereof extending two-dimensionally and at least corresponding to the permissible size range of the spherical article.

Such an arrangement ensures the detection of the diameter of the spherical article since the measuring surface of the measuring element can always be engaged with the corresponding curve section of the spherical article on the diametrical line thereof even though the spherical article is of the maximum or minimum permissible size.

(7) In this spherical-article measuring apparatus, the dial gauge may measure the diametrical line of the spherical article based on the minimum permissible size.

Such an arrangement enables the dial gauge to measure how much larger the spherical article is compared to the minimum permissible size.

(8) In this spherical-article measuring apparatus, the dial gauge may measure the diametrical line of the spherical article based on the maximum permissible size.

Such an arrangement enables the dial gauge to measure how much smaller the spherical article is compared to the maximum permissible size.

(9) This spherical-article measuring apparatus may further comprise a datum setter for setting a reference diameter size of the spherical article. In this spherical-article measuring apparatus, the dial gauge may set a reference value corresponding to the reference diametrical size by holding the datum setter between the first end of the first support arm and the measuring element of the dial gauge.

Such an arrangement enables the datum setter to easily set the reference value of the dial gauge together with the reference diameter size of the spherical article.

(10) In this spherical-article measuring apparatus, the spherical article may be a ten-pin bowling ball.

Such an arrangement ensures and facilitates the measurement of the diameter of the ten-pin bowling ball.

(11) In this spherical-article measuring apparatus, the second support arm may be located to be orthogonal to the first support arm.

(12) In this spherical-article measuring apparatus, the third end may be located at an end of a radial line orthogonal to the diametrical line of the spherical article.

(13) The present invention further provides a method for measuring a spherical article comprising the steps of:
  specifying a base point to be measured on the spherical article;
  setting three parting lines dividing the spherical article into eight portions based on the base point to be measured;
  setting a plurality of intersection points of the three parting lines; and
  measuring a diametrical line of the spherical article with the apparatus as defined in claim 1,
  wherein the size detector and the first end of the first support arm touches two of the plurality of intersection points at both ends of the diametrical line of the spherical article.

According to the present invention, a plurality of intersection points on the three parting lines dividing the spherical article into eight portions are set based on the base point to be measured. The intersection points are used to measure the diameter of the spherical article. Thus, it is possible to measure the diameter of the spherical article on the parting lines accurately. In addition, the roundness of the spherical article can be measured.

(14) In this spherical-article measuring method, the three parting lines may be set by lines imaged by intersection of a surface of the spherical article and three planes, the three planes orthogonally crossing each other, each of the three planes passing through a central point of the spherical article.

(15) In this spherical article measuring method, the plurality of intersection points of the three parting lines may be set at ends of the three orthogonal diametrical lines.

(16) This spherical article measuring method may measure each of the three diametrical lines.

(17) The present invention further provides a method for measuring a spherical article comprising the steps of:
  setting first and second points at opposite ends of a diametrical line in any position on a spherical article to be measured;
  positioning the first end of the apparatus as defined in claim 1 in touch with a first curve section at the first point of the spherical article;
  positioning the second end of the apparatus as defined in claim 1 spaced apart from and opposite to a second curve section at the second point of the spherical article; and
  positioning the third end of the second support arm of the apparatus as defined in claim 1 in touch with a third curve section of the spherical article; and
  positioning the size detector of the apparatus as defined in claim 1 in touch with the second curve section to measure a spacing between the first and second points.

(18) This spherical-article measuring method may further comprise the steps of:
  setting third and fourth points at opposite ends of a diametrical line in a second position of the spherical article;
  positioning the first end in touch with a third curve section at the third point of the spherical article;
  positioning the second end spaced apart from and opposite to a fourth curve section at the fourth point of the spherical article; and
  positioning the size detector in touch with the fourth curve section to measure a spacing between the third and fourth points.

(19) This spherical-article measuring method may further comprise the steps of:
  setting fifth and sixth points at opposite ends of a diametrical line in a third position of the spherical article;
  positioning the first end in touch with a fifth curve section at the fifth point of the spherical article;
  positioning the second end spaced apart from and opposite to a sixth curve section at the sixth point of the spherical article; and
  positioning the size detector in touch with the sixth curve section to measure a spacing between the fifth and sixth points.

(20) This spherical-article measuring method may further comprise the steps of:
  specifying a base point to be measured on the spherical article;
  setting three parting lines dividing the spherical article into eight portions based on the base point to be measured, the three parting lines being imaged by intersection of a surface of the spherical article and three planes, the three planes orthogonally crossing each other, each of the three planes passing through a central point of the spherical article;
  setting a plurality of intersection points on the three parting lines; and
  selecting any pair of intersection points from the intersection points.

BRIEF DESCRIPTION OF THE DRAWING

FIG. 5A is a perspective view illustrating the measurement point indexing prior to finger hole drilling while

DESCRIPTION OF THE EMBODIMENT

One embodiment of the present invention will now be described in detail with reference to the drawings.

Figure 4:
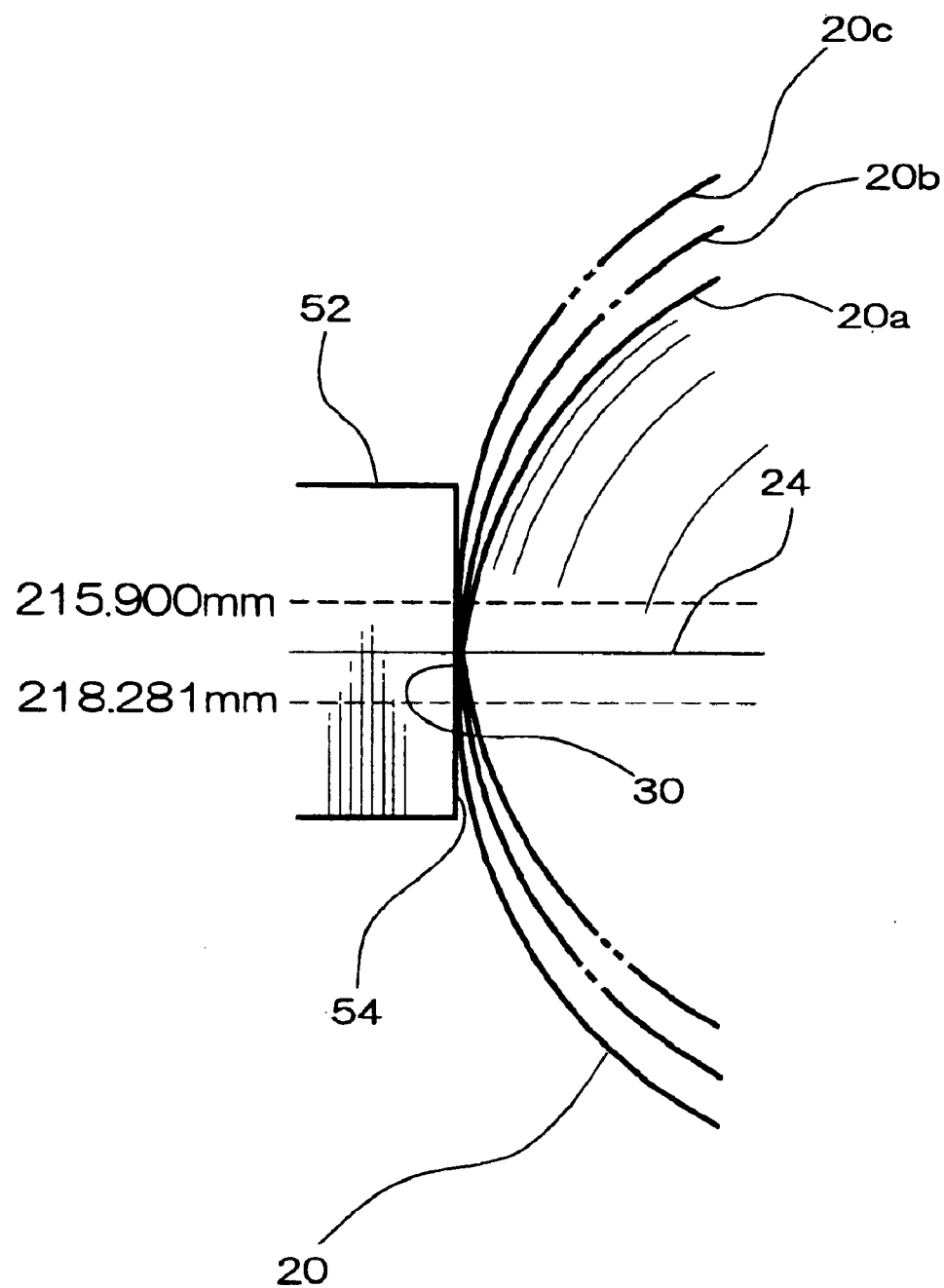
FIG. 4 is a schematic view showing the relationship between the measuring surface of the dial gauge measuring element and the size of the ball.
Figure 5A:
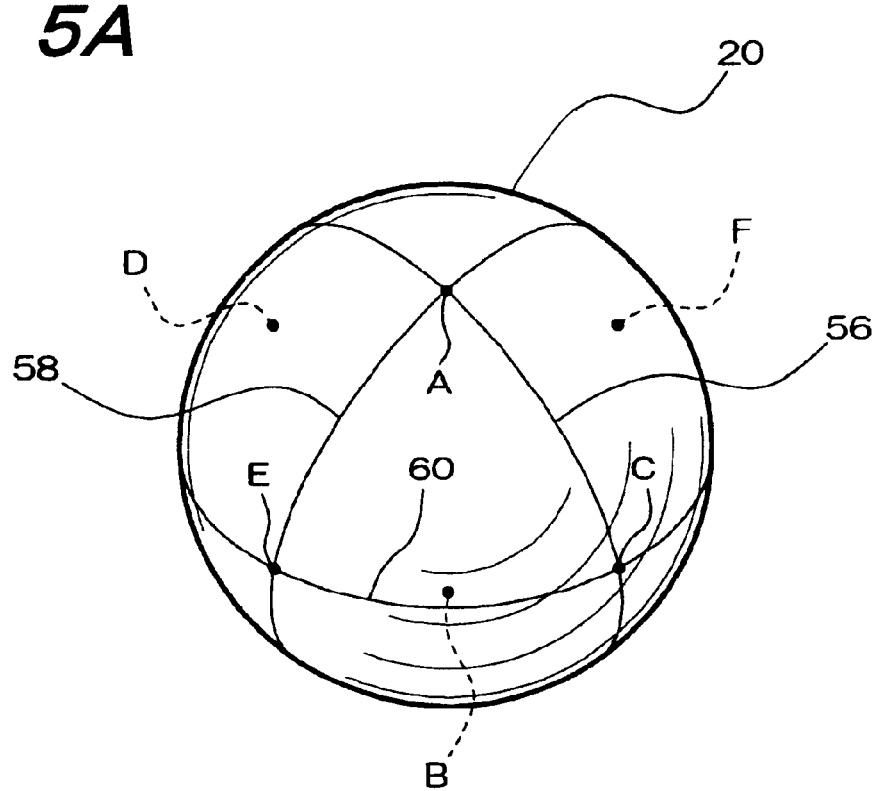

FIGS. 1 through 4 shows an apparatus for measuring a spherical article constructed according to one embodiment of the present invention while FIGS. 5A and B illustrate the measurement of a spherical article.

Figure 1:
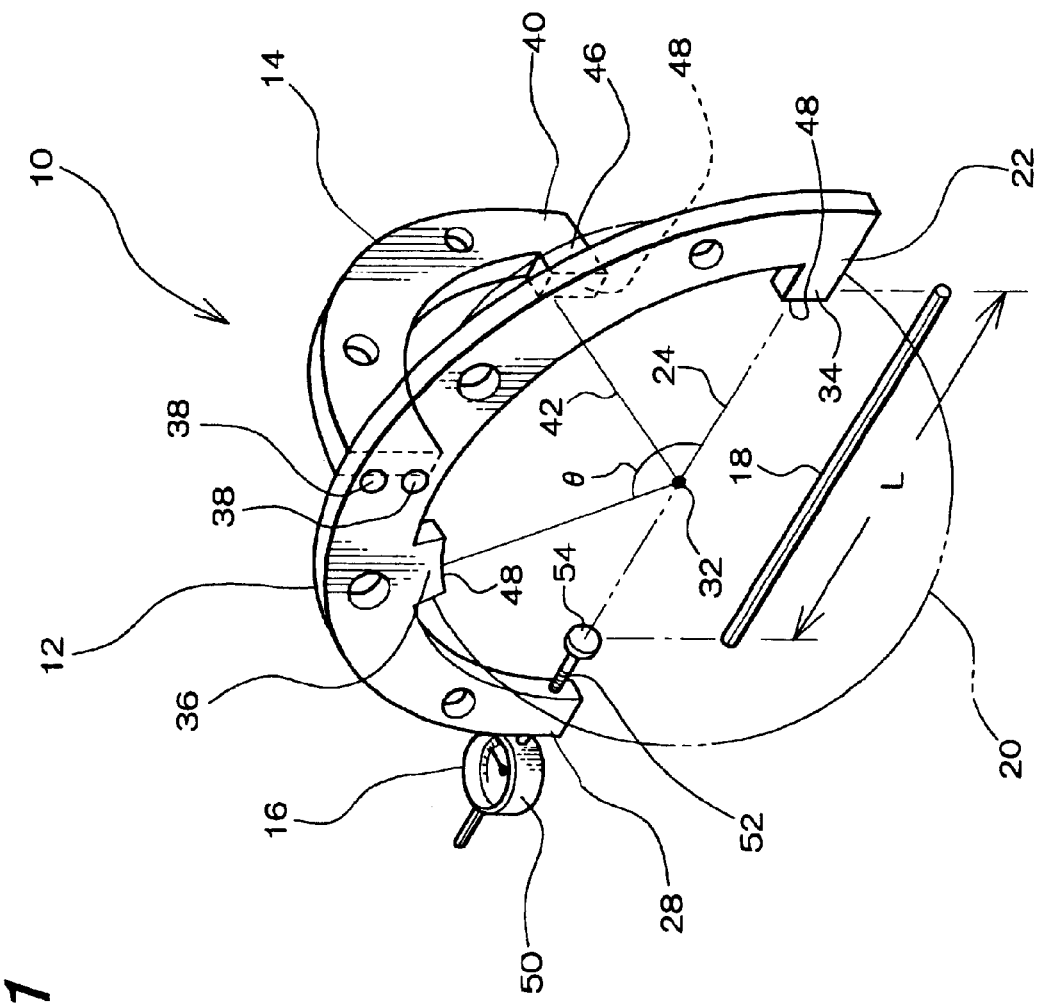
FIG. 1 is a perspective view of a spherical-article measuring apparatus constructed according to one embodiment of the present invention.

Referring first to FIG. 1, there is shown a spherical-article measuring apparatus 10 which comprises a first support arm 12, a second support arm 14 and a dial gauge 16 used as a size detector. In this embodiment, a datum setter 18 is also used.

The spherical-article measuring apparatus 10 is configured to measure the diameter of a spherical article to be measured, for example, a ten-pin bowling ball 20 as shown in FIGS. 2 through 5B.

The diameter of such a ten-pin bowling ball 20 should be within the permissible size range between the maximum permissible size of 218.281 mm and the minimum permissible size of 215.900 mm, which has been regulated by the standards.

The firs support arm 12 is formed by a metal sheet member of substantially semi-circular configuration which has its internal diameter larger than the external diameter of the ball 20.

Figure 2:
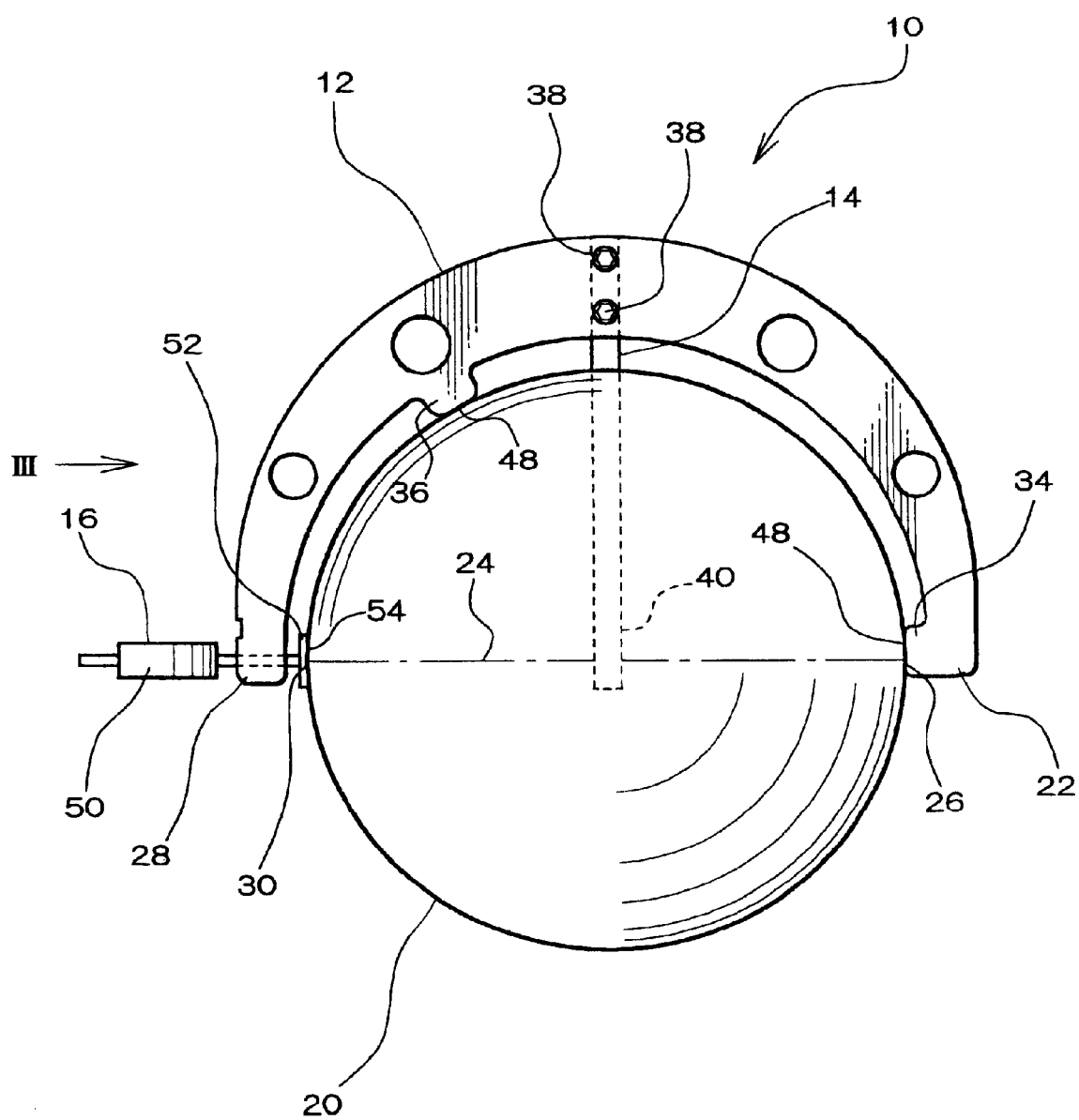
FIG. 2 is a front view of the spherical-article measuring apparatus shown in FIG. 1 being mounted on a ball.
Figure 3:
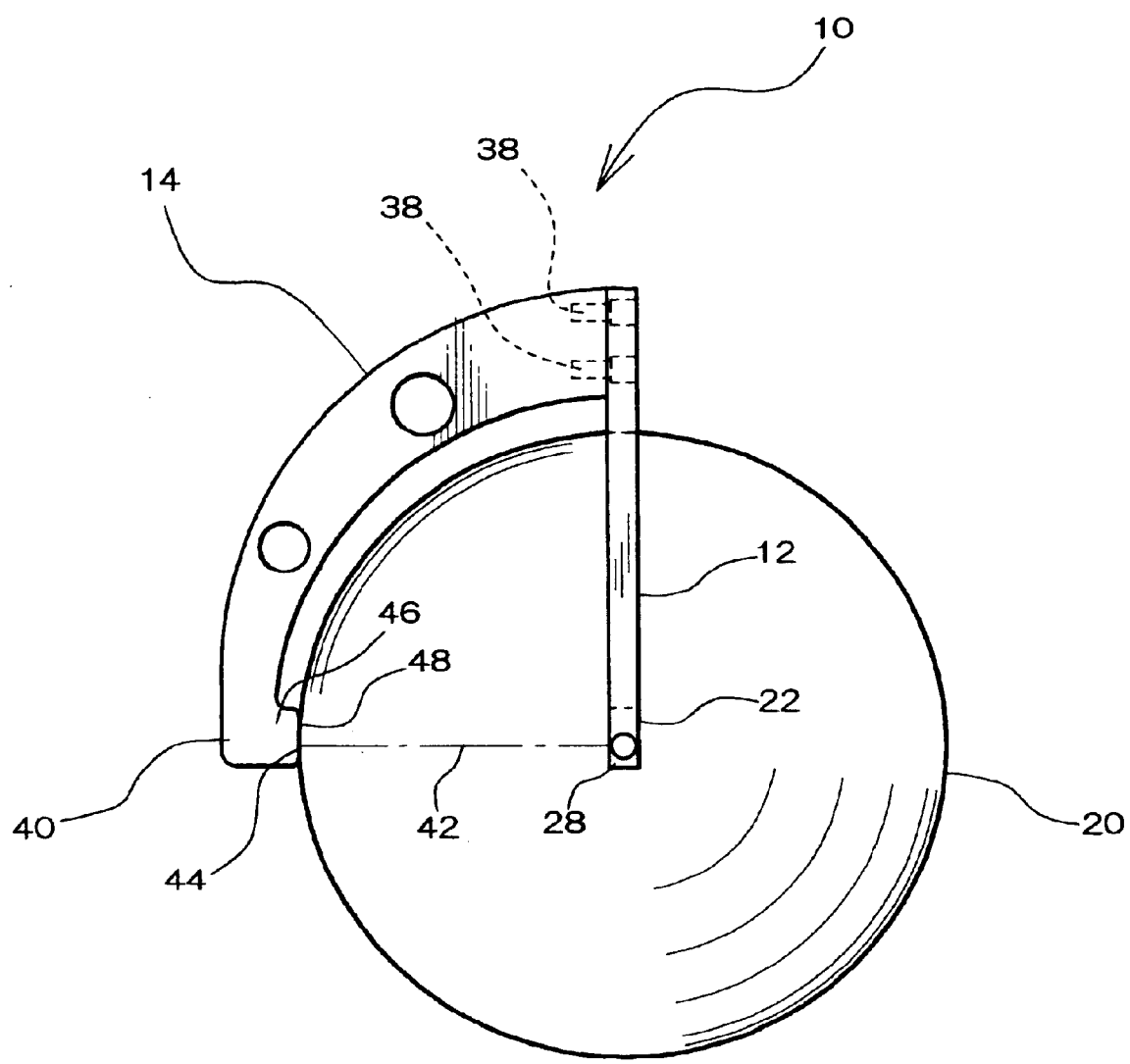
FIG. 3 is a side view as viewed from an arrow III in FIG. 2, the dial gauge being omitted.

Referring now to FIG. 2, the first support arm 12 includes a first end 22 which can be brought in contact with a first curve section 26 of the ball 20 and a second end 28 which can be located spaced apart from and opposite to a second curve section 30 of the ball 20. The first and second curve sections 26, 30 are positioned on the opposite ends of the diametrical line of the ball 20. In other words, the first and second curve sections 26, 30 are located on a line 24 passing through the diameter of the ball 20.

The first support arm 12 includes a spherical-article touching portion 34 extending inwardly from the first end 22 thereof and another similar spherical-article touching portion 36 extending inwardly from the first support arm 12 at a position angularly spaced apart from the first end 22 by an angle θ which is equal to or larger than 90 degrees about the center 32 of the ball 20.

When these spherical-article touching portions 34 and 36 are brought in contact with the ball 20, the second end 28 is supported by the ball 20 spaced apart from the second curve section 30.

The second support arm 14 is different from the first support arm 12 and formed by a metallic member of substantially quadrant configuration which has the internal diameter larger than the external diameter of the ball 20.

The second support arm 14 is detachably mounted on the side face of the first support arm 12 near its top through bolts 38 to be orthogonal to the first support arm 12. The second support arm 14 has a third end 40 located remote from the other end which is mounted on the first support arm 12. The third end 40 can be brought into contact with a third curve section 44 of the ball 20 on a radial line 42 which is orthogonal to the above line 24 passing through the diameter of the ball 20.

The third end 40 includes a spherical-article touching portion 46 extending inwardly therefrom. The spherical-article touching portion 46 can be brought in contact with the third curve section 44 of the ball 20.

When the second support arm 14 is mounted on the first support arm 12 and if the first and second support arms 12, 14 are applied to the surface of the ball 20, three spherical-article touching portions 34, 36 and 46 on the first and second support arms 12, 14 are brought in contact with the ball 20 to support the first and second support arms 12, 14 on the ball 20.

In this case, the first and second support arms 12, 14 will surely be supported on the ball 20 even though the size of the ball 20 varies to some extent, since these support arms are engaged with the ball 20 through the three spherical-article touching portions 34, 36 and 46, rather than direct contact with the surface of the ball 20.

Each of the three spherical-article touching portions 34, 36 and 46 has a spherical-article touching surface 48 extending two-dimensionally and at least corresponding to the permissible size of the ball 20.

Therefore, even if the diameter of the ball 20 varies within the permissible size range, the diametrical line 24 of the ball 20 and the radial line 42 orthogonal to this line 24 are positioned on the spherical-article touching surfaces 24.

The dial gauge 16 has a gauge body 50 and a measuring element 52 extending from the gauge body 50 and can perform measurement with a unit of 1/100 mm.

The measuring element 52 extends through the second end 28 of the first support arm 12 toward the curve section 30 of the ball 20.

The dial gauge 16 is detachably mounted on the first support arm 12. If the first and second support arms 12, 14 and dial gauge 16 are disassembled from the spherical-article measuring apparatus 10, the apparatus may be carried easily without being bulky.

The measuring element 52 of the dial gauge 16 has a measuring surface 54 extending two-dimensionally and at least corresponding to the permissible size of the ball 20.

Therefore, as shown in FIG. 4 the measuring surface 54 will not be disengaged from the curve section 30 of the ball 20 even though the size of the ball 20 may vary and be large, medium or small as shown by 20a, 20b or 20c within the permissible size range. This ensures the measurement of the diameter of the ball 20.

The datum setter 18 is configured to set the reference value of the dial gauge 16 corresponding to the reference diameter size of the ball 20 and formed by a single rod-like member having a predetermined length.

In this embodiment, the datum setter 18 is set to be equal to the minimum permissible size L of the ball 20.

Prior to measurement, the datum setter 18 is held between the spherical-article touching surface 48 of the spherical-article touching portion 34 in the first end 22 of the first support arm 12 and the measuring surface 54 of the measuring element 52 in the dial gauge 16. Maintaining this position, the dial on the gauge body 50 is rotated to set zero. Thus, the reference value can easily be set at the minimum permissible size.

After the reference value of the dial gauge 16 is set, the datum setter 18 is removed to be ready for measurement.

A method of measuring a spherical article using the spherical-article measuring apparatus 10 will be described with reference to FIGS. 5A and B.

To measure the diameter of the ten-pin bowling ball 20 prior to finger-hole drilling, a base point to be measured A on the ball 20 is first specified before the diameter thereof is measured.

In such a case, the base point to be measured A can be specified by measuring a base point of balance zero.

Next, three parting lines 56, 58 and 60 dividing the ball 20 into eight portions are set based on the base point to be measured A. The three parting lines 56, 58 and 60 are lines which are drawn by the surface of the ball 20 intersecting three orthogonal planes (not shown) which pass through the center of the ball 20.

Subsequently, six intersection points A, B, C, D, E and F between the three parting liens 56, 58 and 60 are set. These six intersection points A–F are set at the opposite ends of each of three orthogonal diametrical lines (not shown).

After the reference value in the dial gauge 16 of the spherical-article measuring apparatus 10 has been set, the first and second support arms 12, 14 are applied to the ball 20 so that the spherical-article measuring apparatus 10 is supported on the ball 20 through the spherical-article touching portions 34, 36 and 46. Subsequently, the spherical-article touching portion 48 in the first end 22 of the first support arm 12 and the measuring surface 54 of the measuring element 52 in the dial gauge 16 are brought in contact with two of the above six intersection points, e.g., intersection points A and B located on the opposite ends of one diametrical line, to measure the first diameter on the ball 20.

Subsequently, the spherical-article touching surface 48 of the first end 22 in the first support arm 12 and the measuring surface 54 of the dial gauge 16 are brought in contact with other two intersection points, e.g., intersection points C and D located on the opposite ends of another diametrical line, to measure the second diameter on the ball 20.

Finally, the third diameter between the remaining two intersection points (e.g., E and F) is measured by the spherical-article measuring apparatus 10.

In this case, the diameter of the ball can be determined easily by adding the values measured by the dial gauge 16 to the minimum permissible size, since the reference value in the dial gauge 16 has had the minimum permissible size of zero.

In such a manner, the accurate measurement data of the ball 20 can be obtained by measuring three diameters of the ball 20 at eight divided locations.

Figure 5B:
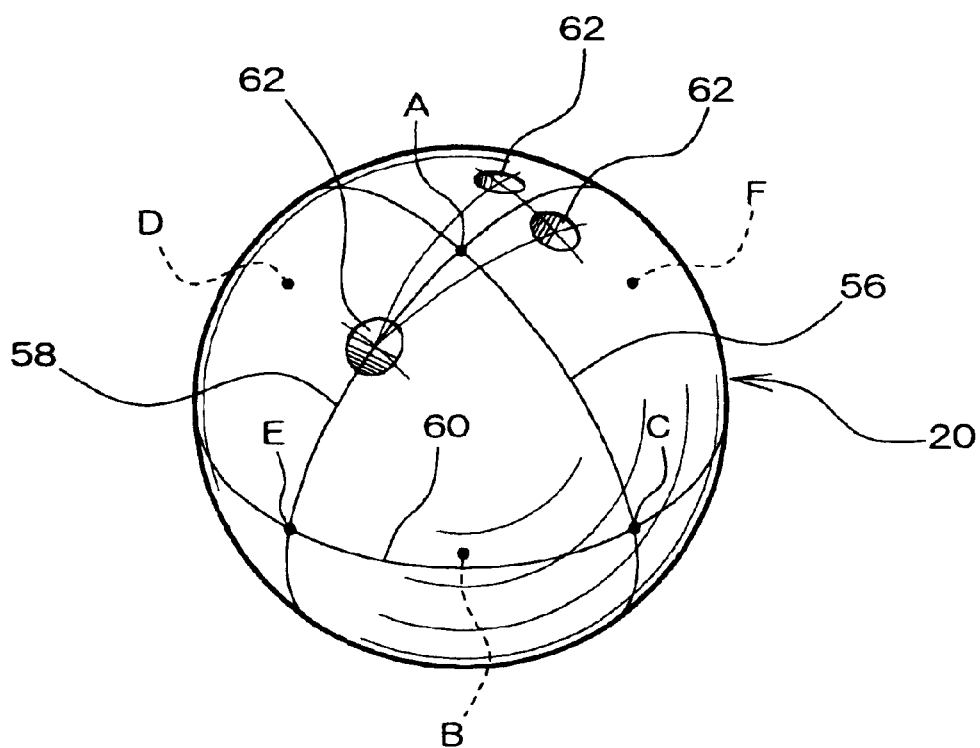
FIG. 5B is a perspective view illustrating the measurement point indexing after finger hole drilling.

When the ball 20 is to be measured after finger holes 62 have been drilled, the base point to be measured A is specified at the span center among the finger holes 62, as shown in FIG. 5B. Thereafter, three parting lines 56, 58 and 60 dividing the ball 20 into eight portions are set based on the base point to be measured A and then six intersection points A–F are set on the three parting lines. As in FIG. 5A, three diameters between the intersection points A and B, between the intersection points C and D and between the intersection points E and F are sequentially measured.

Thus, the roundness exponent of the ball 20 can be determined based on the measured results between the intersection points A and B, between the intersection points C and D and between the intersection points E and F shown in FIGS. 5A and 5B.

The roundness exponent of the ball 20 can be determined through the following formula by taking maximum and minimum values from the measurements between the intersection points A and B, between the intersection points C and D and between the intersection points E and F.

Roundness Exponent=1−(Maximum Value−Minimum Value)÷(Minimum Permissible Size+Maximum Value)×100

When the roundness exponent has been determined by the above formula, the distortion in the ball 20 can be determined. Thus, a player can select the ball of the same size for every match. Furthermore, the player can select a ball of different size depending on his or her intention.

The present invention is not limited to the aforementioned embodiment, but may be modified or changed to any of various other forms without departing the scope of the invention.

For example, the first and second support arms may be of square configuration, although the embodiment of the present invention has been described as to the first support arm of substantially semi-circular form and the second support arm of quadrant form.

Although the embodiment of the present invention has also been described as to the dial gauge used as a size detector, the present invention may use any of various other forms such as micrometers and other size detectors unless they can measure the spherical article by applying the measuring element to the spherical article.

Although the embodiment of the present invention has been described as to the ten-pin bowling ball, the present invention may be used to measure any of various other balls such as billiards balls, volleyball balls and soccer balls.

Although the embodiment of the present invention has been described as to the measurement of the spherical article diameter by setting the datum setter at the minimum permissible size of the spherical article and using the minimum permissible size as a reference, the present invention may be used to measure the diameter of the spherical article by setting the datum setter at the maximum permissible size of the spherical article and using the maximum permissible size as a reference.

What is claimed is:

1. An apparatus for measuring a spherical article comprising:
    a first support arm having first and second ends, the first end being touchable to a first curve section at one end of a diametrical line of a spherical article to be measured, the second end being locatable spaced apart from and opposite to a second curve section at the other end of the diametrical line;
    a second support arm provided on the first support arm and having a third end touchable to a third curve section of the spherical article; and
    a size detector provided on the second end of the first support arm and having a moveable portion to touch the second curve section.

2. The apparatus according to claim 1, wherein the spherical article is a ten-pin bowling ball.

3. The apparatus according to claim 1, wherein the second support arm is located orthogonal to the first support arm.

4. The apparatus according to claim 3, wherein the third end is located at an end of a radial line orthogonal to the diametrical line of the spherical article.

5. An apparatus for measuring a spherical article comprising:
    a first support arm having first and second ends, the first end being touchable to a first curve section at one end of a diametrical line of a spherical article to be measured, the second end being locatable spaced apart from and opposite to a second curve section at the other end of the diametrical line;
    a second support arm provided on the first support arm and having a third end touchable to a third curve section of the spherical article; and
    a size detector provided on the second end of the first support arm and being touchable to the second curve section,
    wherein the size detector detects whether or not a size of the spherical article is within a permissible size range.

6. The apparatus according to claim 5, further comprising:
    a first spherical-article touching portion extending from the first end of the first support arm;
    a second spherical-article touching portion extending from a portion of the first end of the first support arm at a position rotated by an angle greater than or equal to 90 degrees about a central point of the spherical article from the first end of the first support arm; and a third spherical-article touching portion extending from the third end of the second support arm.

7. The apparatus according to claim 6, wherein each of the spherical-article touching portions has a spherical-article touching surface which extends two-dimensionally and at least corresponds to the permissible size range of the spherical-article.

8. The apparatus according to claim 5, wherein the size detector has a dial gauge and a measuring element, the measuring element extending from the second end of the first support arm toward the second curve section of the spherical article.

9. The apparatus according to claim 8, wherein the measuring element has a measuring surface at a tip end thereof extending two-dimensionally and at least corresponding to the permissible size range of the spherical article.

10. The apparatus according to claim 8, wherein the dial gauge measures the diametrical line of the spherical article based on a minimum permissible size.

11. The apparatus according to claim 8, wherein the dial gauge measures the diametrical line of the spherical article based on a maximum permissible size.

12. The apparatus according to claim 8, further comprising: a datum setter for setting a reference diametrical size of the spherical article, wherein the dial gauge sets a reference value corresponding to the reference diametrical size by holding the datum setter between the first end of the first support arm and the measuring element of the dial gauge.

13. A method for measuring a spherical article comprising the steps of:

specifying a base point to be measured on the spherical article;

setting three parting lines dividing the spherical article into eight portions based on the base point to be measured;

setting a plurality of intersection points of the three parting lines; and measuring a diametrical line of the spherical article with the apparatus as defined in claim 1, wherein the size detector and the first end of the first support arm touches two of the plurality of intersection points at both ends of the diametrical line of the spherical article.

14. The method according to claim 13, wherein the three parting lines are set by lines imaged by intersection of a surface of the spherical article and three planes, the three planes orthogonally crossing each other, each of the three planes passing through a central point of the spherical article.

15. The method according to claim 13, wherein the plurality of intersection points of the three parting lines are set at ends of three orthogonal diametrical lines.

16. The method according to claim 15, wherein each of the three diametrical lines is measured.

17. A method for measuring a spherical article comprising the steps of:

setting first and second points at opposite ends of a diametrical line in any position on a spherical article to be measured;

positioning the first end of the apparatus as defined in claim 1 in touch with a first curve section at the first point of the spherical article;

positioning the second end of the apparatus as defined in claim 1 spaced apart from and opposite to a second curve section at the second point of the spherical article;

positioning the third end of the second support arm of the apparatus as defined in claim 1 in touch with a third curve section of the spherical article; and positioning the size detector of the apparatus as defined in claim 1 in touch with the second curve section to measure a spacing between the first and second points.

18. The method according to claim 17, further comprising the steps of:

setting third and fourth points at opposite ends of a diametrical line in a second position of the spherical article;

positioning the first end in touch with a third curve section at the third point of the spherical article;

positioning the second end spaced apart from and opposite to a fourth curve section at the fourth point of the spherical article; and positioning the size detector in touch with the fourth curve section to measure a spacing between the third and fourth points.

19. The method according to claim 18, further comprising the steps of:

setting fifth and sixth points at opposite ends of a diametrical line in a third position of the spherical article;

positioning the first end in touch with a fifth curve section at the fifth point of the spherical article;

positioning the second end spaced apart from and opposite to a sixth curve section at the sixth point of the spherical article; and positioning the size detector in touch with the sixth curve section to measure a spacing between the fifth and sixth points.

20. The method according to claim 17, further comprising the steps of:

specifying a base point to be measured on the spherical article;

setting three parting lines dividing the spherical article into eight portions based on the base point to be measured, the three parting lines being imaged by intersection of a surface of the spherical article and three planes, the three planes orthogonally crossing each other, each of the three planes passing through a central point of the spherical article;

setting a plurality of intersection points on the three parting lines; and selecting any pair of the intersection points from the intersection points.

\* \* \* \* \*